A. H. ROSSOW & J. H. SCHAFER.
GANG PLOW.
APPLICATION FILED JAN. 2, 1913.
1,086,860.
Patented Feb. 10, 1914.
2 SHEETS—SHEET 1.
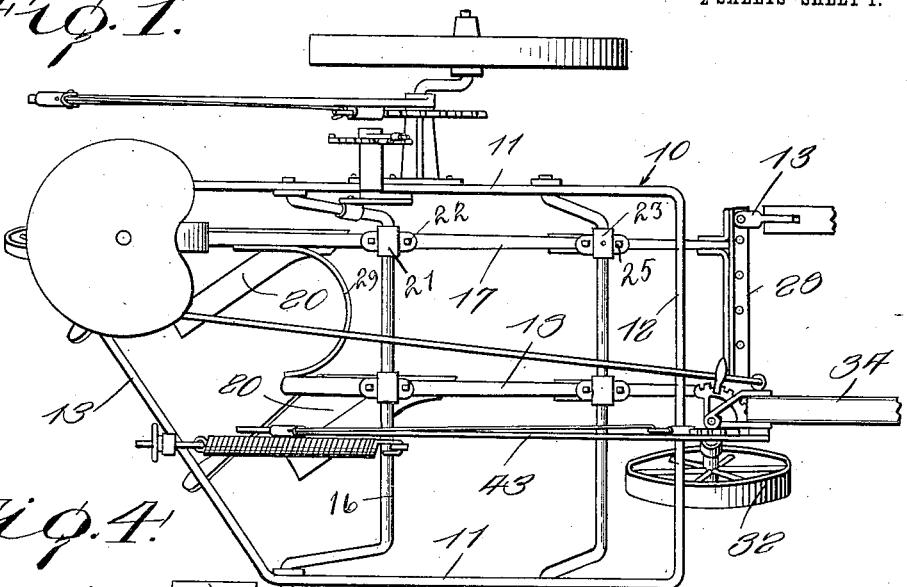
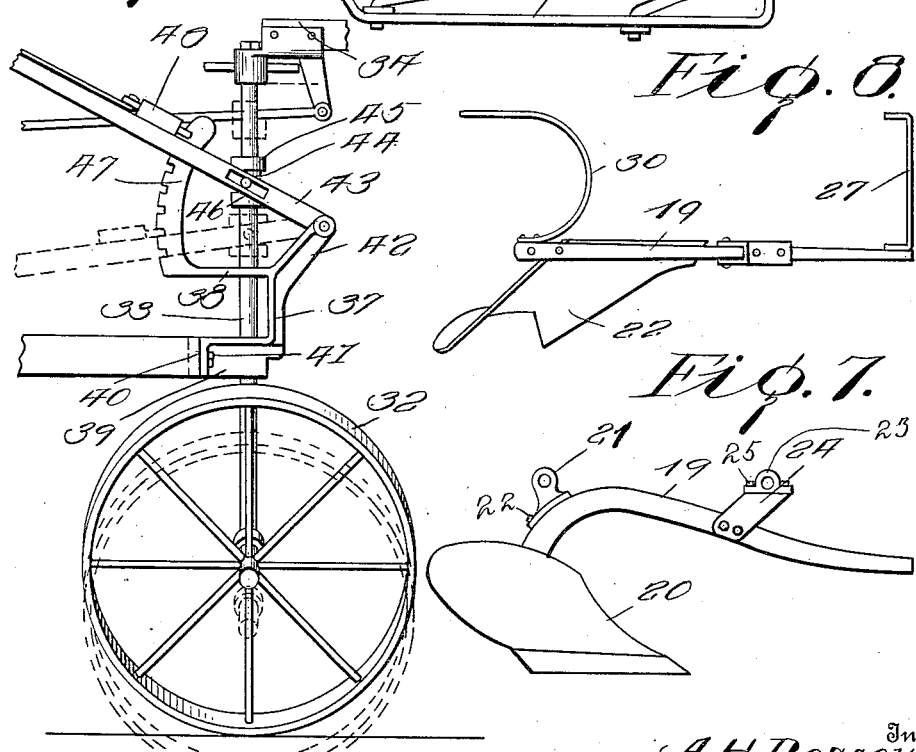
Witnesses
B. L. Brann
Francis Boyle
Inventor
A. H. Rossow
J. H. Schafer
By Chandler & Chandler
Attorney A. H. ROSSOW & J. H. SCHAFER.
GANG PLOW.
APPLICATION FILED JAN. 2, 1913.
1,086,860.
Patented Feb. 10, 1914.
2 SHEETS—SHEET 2.
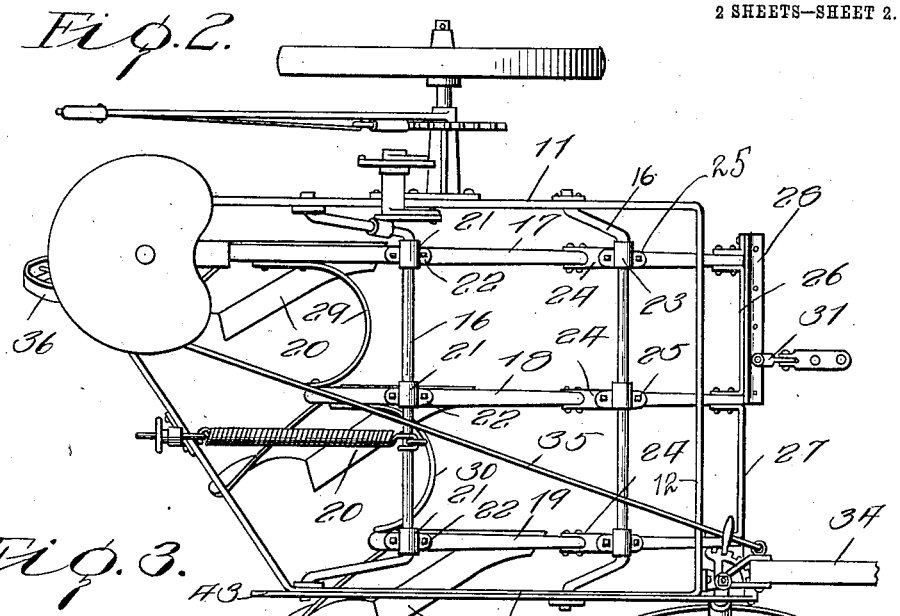
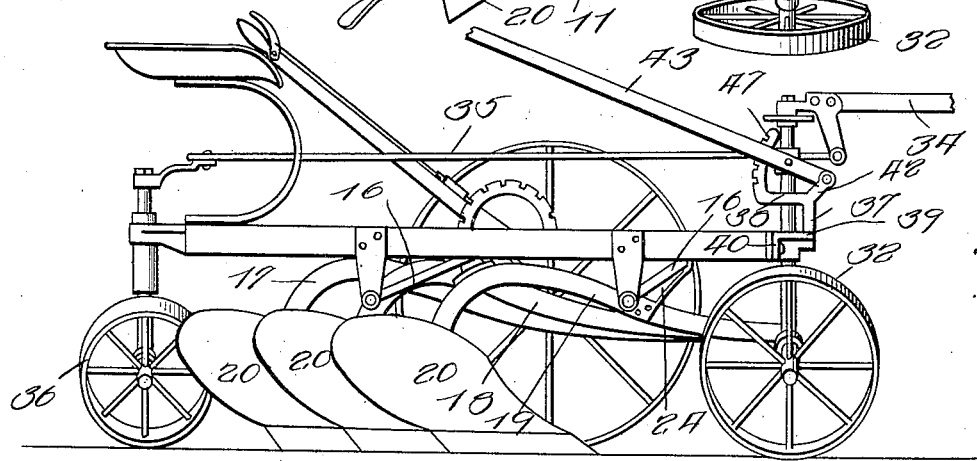
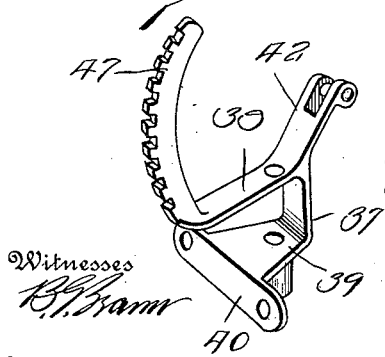
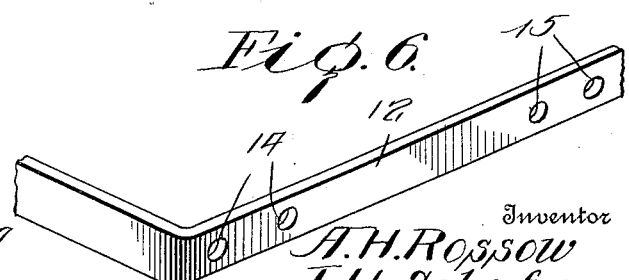
Witnesses
B. T. Bram
Francis Boyle
Inventor
A. H. Rossow
J. H. Schafer
By
Attorney

UNITED STATES PATENT OFFICE.

ALBERT H. ROSSOW AND JOHN H. SCHAFER, OF FLORENCE, SOUTH DAKOTA.

GANG-PLOW.

1,086,860. Specification of Letters Patent. Patented Feb. 10, 1914.

Application filed January 2, 1913. Serial No. 739,820.

*To all whom it may concern:*

Be it known that we, ALBERT H. ROSSOW and JOHN H. SCHAFER, citizens of the United States, residing at Florence, in the county of Codington, State of South Dakota, have invented certain new and useful Improvements in Gang-Plows; and we do hereby declare the following to be a full, clear, and exact description of the invention, such as will enable others skilled in the art to which it appertains to make and use the same.

This invention relates to gang plows and has for an object to provide a device of this character which may be easily and quickly converted into a two-gang or three-gang plow.

A further object of the invention is to provide a novel bracket for the front furrow wheel, this bracket being adapted to be shifted transversely across the plow frame to facilitate proper draft when the plow is to be used either as a two-gang or three-gang plow.

A still further object of the invention is to provide a separate plow beam with suitable appliances to facilitate easy application and removal from the plow frame.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a plan view of a two-gang plow embodying our improvements. Fig. 2 is a plan view of a three-gang plow converted in accordance with our invention from the two-gang plow shown in Fig. 1. Fig. 3 is a side elevation of the parts shown in Fig. 2. Fig. 4 is an enlarged side elevation of the front furrow wheel and attaching bracket. Fig. 5 is a perspective view of the attaching bracket. Fig. 6 is a fragmentary elevation showing the attaching openings for securing the bracket in adjusted positions on the frame. Fig. 7 is a side elevation of the separate plow beam. Fig. 8 is a plan view of the separate plow beam.

Referring now to the drawings in which like characters of reference designate similar parts, 10 designates the plow frame which includes parallel side bars 11, a front bar 12 perpendicular to both side bars, and a rear bar 13 which inclines forwardly from one side bar to the opposite side bar. The front side bar is formed near one corner with a pair of openings 14, and is provided near the center with a second pair of openings 15.

Referring now to Fig. 2 it will be seen that a pair of bails 16 are suitably secured to the sides 11 of the frame, and suspended from these bails are three plow beams 17, 18 and 19 spaced equidistantly apart, and each equipped at the rear end with a plow 20. The beams are all secured to the rear bail by means of sleeves 21 which are provided with attaching lips through which and their respective beams, bolts 22 are passed. The beams are all secured to the front bail by means of sleeves 23 through which and forwardly inclined bracket arms 24 carried by the beams, bolts 25 are passed. The front ends of all the beams are connected by U-shaped cross braces 26 and 27, the brace 26 connecting the beams 17 and 18 and carrying a perforated clevis iron 28, and the brace 27 connecting the beams 18 and 19. The rear ends of the beams 17 and 18 are connected by an arcuate brace 29, and the rear ends of the beams 18 and 19 are connected by an arcuate brace 30.

In the carrying out of our invention it is desired to convert the three-gang plow into a two-gang plow by removing the beam 19, such removal being effected by detaching the front and rear cross braces 27 and 30 from the intermediate beam 18 and detaching the beam from the attaching sleeves 21 and 23 carried by the rear and front bails by removing the securing bolts of these sleeves. When the plow is to be used as a three-gang plow, the furrow wheel about to be described must be located in a different position than when the plow is to be used as a two-gang plow in order to insure proper draft. To attain this end the furrow wheel is located at the corner of the main frame when the plow is to be used as a three-gang plow, and is located near the center of the front bar of the frame when the plow is to be used as a two-gang plow, the attaching clevis 31 of the eveners (not shown) being adjusted longitudinally of the clevis iron 28 to correspond with such shifting of the furrow wheel, as is shown in Figs. 1 and 2.

The furrow wheel 32 is provided with an upright stem 33 which carries at the upper ends a draft pole 34 that is connected by a rod 35 to the rear furrow wheel 36 to insure simultaneous turning of both wheels. The stem is journaled in a substantially U-shaped bracket 37 the legs 38 and 39 of which extend horizontally, the leg 39 being provided with a flange 40 through which bolts 41 are passed. When the front furrow wheel is located at the corner of the main frame, the bolts 41 are passed through the above mentioned openings 14 formed near the corner of the front bar 12 of the frame, and when the furrow wheel is located near the center of the front bar, the bolts are passed through the above mentioned openings 15, and securely clamp the bracket to the front bar 12.

The bracket 37 is provided with an upwardly and forwardly inclining arm 42 which is terminally bifurcated to pivotally receive a landing lever 43 that is pivotally connected to a sleeve 44 which surrounds the front furrow wheel stem and is held in position thereon by collars 45 and 46. The upper leg 38 of the bracket is equipped with an upright notched segment 47 which is operatively engaged by a pawl 48 carried by the landing lever to lock the lever in any adjusted position.

What is claimed, is:—

In a gang plow, the combination of a main frame including a front bar, a plurality of plow beams permanently carried by said frame, a separate plow beam carried by said frame and adapted to be detached therefrom, a front furrow wheel, and an attaching bracket for said furrow wheel adapted to be attached near the end of said bar when said separate plow beam is applied, and adapted to be attached near the center of said bar when said separate plow beam is removed.

In testimony whereof, we affix our signatures, in the presence of two witnesses.

ALBERT H. ROSSOW.
JOHN H. SCHAFER.

Witnesses:
P. N. LARSON,
G. J. EGGEN.

Copies of this patent may be obtained for five cents each, by addressing the "Commissioner of Patents, Washington, D. C."